2,953,598
ACYL HYDRAZINES

Robert L. Clark, Woodbridge, and Arsenio A. Pessolano, Colonia, N.J., assignors to Merck & Co., Inc., Rahway, N.J., a corporation of New Jersey No Drawing. Filed Oct. 15, 1957, Ser. No. 690,194

6 Claims. (Cl. 260—558)

This invention relates to substituted hydrazines. In one of its more particular aspects, this invention relates to hydrazides of substituted acrylic acids.

The compounds of this invention are N,N'-substituted hydrazines wherein one of the substituents is the acyl radical of β,β-diphenylacrylic acid and the other substituent is another acyl radical. These compounds may be represented by the general formula

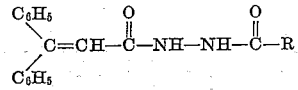

wherein R represents a hydrogen atom or an alkyl, aryl, aralkyl, alkaryl or heterocyclic radical. Each of these radicals may be substituted or unsubstituted and, in the case of those radicals containing alkyl moieties, may be either straight chain or branched chain radicals.

The compounds of this invention can be used as anticonvulsants without causing sedation and are also useful as potentiators of barbiturate anesthesia.

These novel compounds are prepared by reacting β,β-diphenylhydracrylic acid hydrazide with an acylating agent. The reaction is conducted at elevated temperatures, that is, temperatures above about 70° C.

The starting material for the preparation of the compounds of this invention, N-(3,3-diphenyl-3-hydroxypropionyl) hydrazine, may be prepared by the reaction of esters of 3,3-diphenyl-3-hydroxypropionic acid with hydrazine. The propionic acid esters may be prepared in turn by a Reformatsky reaction utilizing benzophenone, an ester of an α-haloacetic acid such as ethyl bromoacetate, and zinc. These reactions may be indicated by the following sequence of equations:

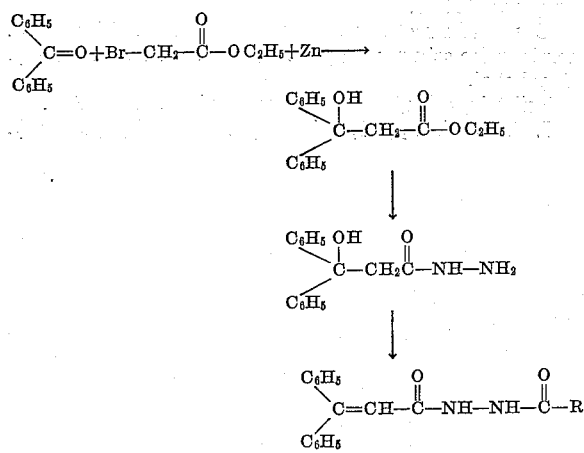

The preparation of the compounds of this invention from N-(3,3-diphenyl-3-hydroxypropionyl) hydrazine may be accomplished by the use of any convenient acylating agent, such as an acyl halide or an acid anhydride. The reaction is advantageously conducted by heating N-(3,3-diphenyl-3-hydroxypropionyl) hydrazine and the acylating agent in the presence of a suitable solvent. The heating can, in general, be advantageously accomplished by placing the reaction mixture on a steam bath in order to permit refluxing of the mixture during the dehydration reaction. Higher temperatures may be utilized if desired.

Solvents which are suitable for use in this reaction include the substantially neutral, non-polar solvents, such as hydrocarbon solvents of from about the $C_6$–$C_{10}$ range which may either be straight chain or branched chain hydrocarbons, aromatic hydrocarbons such as benzene, toluene and xylene, chlorinated hydrocarbons of the same range as the unsubstituted hydrocarbons, cyclohexane and other cycloaliphatic hydrocarbons and ether and other similar solvents. The products are recovered as crystalline materials and may be purified by standard recrystallization techniques.

The invention may be better understood by reference to the following examples which are included for purposes of illustration and are not intended to be in any way limiting to the scope of the instant invention.

EXAMPLE 1

*N-(3-phenylcinnamoyl) N'-formyl hydrazine*

To 700 ml. of dry benzene was added 182 g. of benzophenone and 80 g. of freshly cleaned zinc granules, 20–30 mesh. The mixture was stirred rapidly and heated to reflux. A solution of 185 g. of ethyl bromoacetate in 300 ml. of dry benzene was then added to the mixture over a period of 2 hours, keeping the reaction mixture at gentle reflux during the addition. The resulting mixture was refluxed for another 3 hours and then cooled in ice and treated with a solution of 200 ml. of concentrated sulfuric acid and 1,000 ml. of water by adding the solution dropwise over a period of 1 hour. Three hundred ml. of ether was added and the organic layer separated, washed with water and sodium bicarbonate solution, dried over magnesium sulphate and evaporated. Petroleum ether was then added to the residue and 179 g. of ethyl 3,3-diphenyl-3-hydroxypropionate in the form of needles having a melting point of 77–80° C. was obtained.

This material was converted to the hydrazide without further purification as follows:

A mixture of 60 g. of the crude ethyl 3,3-diphenyl-3-hydroxypropionate and 120 ml. of 85% hydrazine hydrate was heated on a steam bath for 1 hour. The organic layer which formed was separated and cooled and the hydrazide crystallized as white rods. The product N-(3,3-diphenyl-3-hydroxypropionyl) hydrazine was obtained in a yield of 54.3 g. and was found to have a melting point of 130–131° C. This product was used in the preparation of N-(3-phenylcinnamoyl) N'-formyl hydrazine.

In 20 ml. of 98–100% formic acid was slowly dissolved 6.0 g. of N-(3,3-diphenyl-3-hydroxypropionyl) hydrazine. The reaction mixture was refluxed for 10 minutes. The excess formic acid was removed from the resulting crystalline mass and 20 ml. of absolute ethanol was added to the white solid. The small white crystals were found to weigh 4.5 g. and were recrystallized from dilute acetic acid giving small rods having a melting point of 251° C.

EXAMPLE 2

*N-(3-phenylcinnamoyl) N'-isobutyryl hydrazine*

To 50 ml. of benzene was added 5.0 g. of N-(3,3-diphenyl-3-hydroxypropionyl) hydrazine and 2.11 g. of isobutyryl chloride. The reaction mixture was refluxed for 10 minutes. A crop of small white needles crystallized. The solid weighing 5.3 g. was taken up in 50 ml. of hot absolute ethanol and 50 ml. of petroleum ether was added. Upon standing the clear solution yielded small white needles which were found to have a melting point of 237–238° C.

EXAMPLE 3

*N-(3-phenylcinnamoyl) N'-(diphenylacetyl) hydrazine*

A mixture of 4.4 g. of N-(3,3-diphenyl-3-hydroxypropionyl) hydrazine and 4.0 g. of diphenylacetyl chloride in 50 ml. of dry benzene was heated to reflux. A homogeneous solution formed and there was a vigorous evolution of hydrogen chloride. Within 15 minutes a white precipitate came out of the refluxing mixture. Heating was continued for another 15 minutes. The solid product was found to weigh 7.0 g. The product was purified by dissolving it in 200 ml. of absolute ethanol and adding 50 ml. of water to the hot solution. The product crystallized as small white needles having a melting point of 232–234° C.

Other N-(3-phenylcinnamoyl) N'-acyl hydrazines which may be prepared in a manner similar to the above examples include the N'-propionyl, N'-butyryl, N'-pentanoyl and similar alkanoyl hydrazines. In addition, compounds such as N-(3-phenylcinnamoyl) N'-naphthoyl hydrazine and the N'-cinnamoyl, N'-thenoyl, N'-nicotinoyl, N'-toluyl and other acyl hydrazines of the aroyl, aralkanoyl and alkaroyl series, as well as hydrazines substituted with a heterocyclic acyl radical may be similarly prepared.

The novel compounds of the instant invention are effective anti-convulsants and barbiturate potentiators when taken orally and may therefore be administered in the form of capsules or tablets. The capsules should contain about 0.25 g. to about 0.50 g. of the pure N-(3-phenyl-cinnamoyl) N'-acyl hydrazines. The tablets should contain approximately 0.25 g. to about 0.50 g. of the pure acyl hydrazines as well as a small amount of a lubricant such as magnesium stearate and a disintegrating agent such as cornstarch. The compounds of this invention may also be utilized in other conventional formulations.

Various changes and modifications of the invention can be made, and to the extent that such variations incorporate the spirit of the instant invention, they are intended to be included within the scope of the appended claims.

What is claimed is:

1. A product selected from the group consisting of N-(3-phenylcinnamoyl) N'-acyl hydrazines of the general formula

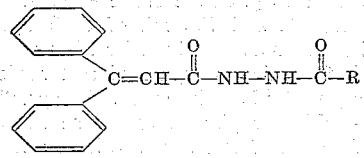

wherein R is a member selected from the group consisting of hydrogen, lower alkyl containing from 1 to about 4 carbon atoms, lower phenylalkyl containing from 7 to about 14 carbon atoms, 2-thienyl, 3-pyridyl and naphthyl.

2. N-(3-phenylcinnamoyl) N'-formyl hydrazine.
3. N-(3-phenylcinnamoyl) N'-isobutyryl hydrazine.
4. N-(3-phenylcinnamoyl) N'-diphenylacetyl hydrazine.
5. A process for the preparation of N-(3-phenylcinnamoyl) N'-acyl hydrazines of the general formula

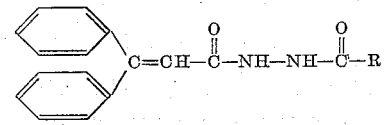

wherein R is a member selected from the group consisting of lower alkyl containing from 1 to about 4 carbon atoms, 2-thienyl, 3-pyridyl, naphthyl and lower phenylalkyl containing from 7 to about 14 carbon atoms, the steps of which comprise (i) combining N-(3,3-diphenyl-3-hydroxypropionyl) hydrazine with an organic acylating agent selected from the group consisting of compounds of the formula

where $R_1$ is a member selected from the group consisting of lower alkyl having from 1 to about 4 carbon atoms, 2-thienyl, 3-pyridyl, naphthyl and lower phenylalkyl containing from 7 to about 14 carbon atoms and hydrogen, and X is selected from the group consisting of hydroxyl and halogen, and (ii) heating the reaction mixture at a temperature of at least 70° C. for a period of time in the range of 5 to 120 minutes.

6. The process of claim 5 wherein the N-(3,3-diphenyl-3-hydroxypropionyl) hydrazine is added to the organic acylating agent in the presence of a substantially neutral non-polar solvent.

References Cited in the file of this patent

UNITED STATES PATENTS 2,765,304    Siegrist et al. _____ Oct. 2, 1956

OTHER REFERENCES

Chem. Abstracts, vol. 5, p. 3572 (1911), citing J. Prakt Chem. [2], vol. 83, pp. 513–540 (1905).

Chem. Abstracts, vol. 28, p. 5441 (1934), citing Acta Acad. Aboensis Math. et Phys., vol. 6 #12, Aspelund, 15 pages (1932).

Chem. Abstracts, vol. 48, p. 5189 (1954), citing Rend. seminar fac sci univ. Cagliari, vol. 22, pp. 78–80 (1952), Paggi et al.

Beilstein, 4th ed., vol. IX, 1st suppl., p. 53 (1932).

J. Prakt Chem. [2], vol. 95, p. 205 (1917) (Curtius).